United States Patent [19]

Yuen

[11] Patent Number: 4,941,117

[45] Date of Patent: Jul. 10, 1990

[54] MULTIPLE CHANNEL ADAPTIVE CORRELATION/DECORRELATION PROCESSOR

[75] Inventor: Stanley M. Yuen, Marlton, N.J.

[73] Assignee: General Electric Company, Moorestown, N.J.

[21] Appl. No.: 240,873

[22] Filed: Sep. 7, 1988

[51] Int. Cl.⁵ ............................................. G06F 15/31
[52] U.S. Cl. ........................... 364/724.07; 364/724.01
[58] Field of Search ..................... 364/724.01, 724.06, 364/724.07, 724.08, 724.09, 724.11, 728.03

[56] References Cited

U.S. PATENT DOCUMENTS

| | | | |
|---|---|---|---|
| 4,354,248 | 10/1982 | Conger et al. | 364/724.08 |
| 4,438,504 | 3/1984 | Favin | 364/724.06 |
| 4,797,807 | 1/1989 | Gerlach | 364/724.07 |

OTHER PUBLICATIONS

"An Efficient Algorithm and Systolic Architecture for Multiple Channel Adaptive Filtering" by Yuen et al., published in IEEE Transactions on Antennas and Propagation, vol. 36, No. 5, May 1988.

"A Recursive Least–Squares Algorithm with Multiple Inputs and Outputs, and a Cylindrical Systolic Implementation" by Yuen et al. sent to IEEE for review about Mar., 1988, (not published).

Primary Examiner—Dale M. Shaw
Attorney, Agent, or Firm—William H. Meise

[57] ABSTRACT

Signals arriving from N channels are processed by an array of two-input, two-output decorrelation processors to produce N output channels in which the signals from each of the input channels are decorrelated from all of the other channels. The array of processors includes N-2 rows, each row containing N processors in a regular array having a form equivalent to a cylinder. The array of processors also includes a further last row containing N/2 processors, the outputs of which are the desired signals. An arrangement using a single row of N processors with switched feedback allows equivalent batch processing.

2 Claims, 4 Drawing Sheets

MULTIPLE CHANNEL ADAPTIVE CORRELATION/DECORRELATION PROCESSOR

BACKGROUND OF THE INVENTION

This invention relates to architecture for correlation of signals in one of a plurality of channels with simultaneous decorrelation with respect to signals in other channels.

In radar systems using array antennas, the signals from each separate antenna (or from subgroups of the antennas of the array) are processed by down converting to produce a baseband signal having amplitude and phase. The amplitude and phase of the signal received by each antenna may be represented by a complex number such as $A+j\Phi$. In general, the amplitude of the signals received by each antenna of an antenna array will be equal, so long as the antenna is distant from the target. However, the relative phase of the signal received by each antenna will differ markedly from those of other antennas in the array, depending upon the direction from which the signal arrives. In general, the phase of the received signals will not be the same for all antennas of the array even if the target is on the boresight, because of the lateral dimensions of the array. Modern radar systems using array antennas use phase shifters or delay elements associated with each antenna and possibly with subgroups of antennas to create phase shifts which allow the preferred direction of reception (main beam) to be moved about within the volume of interest. In modern phased-array antennas, the signals from the antennas are summed, possibly with phase shifts, to receive signals from predetermined portions of the volume being examined in preference to signals from other directions. Sophisticated array antenna systems can be subdivided so as to produce several main antenna beams or preferred directions of reception so as to simultaneously track several targets. Whether there be one main beam or several, the antenna nevertheless may respond at a low level to signals received from directions other than the main beam direction.

In the context of wartime use of a radar system, the desired signal being tracked by the main beam may be obscured by one or more extraneous signals being received from non-preferred directions, because the extraneous signals have a very high power level. This might be the result of efforts to jam the radar system. The effect of reception from undesired directions can be reduced by sidelobe cancelling circuits which include networks, such as the modified Gram-Schmidt N-channel decorrelation networks described in the article "An Efficient Algorithm and Systolic Architecture for Multiple Channel Adaptive Filtering" by Yuen et al., published in the IEEE Transactions on Antenna and Propagation., Vol. 36, No. 5, May 1988. In the arrangement described therein, signals received over multiple channels, one of which represents the desired signal, are correlated in the desired channel and decorrelated from the signals received from the other channels. If all the channels are receiving the undesired signal, the desired signal in the first channel can be rendered substantially free of the undesired signals. The modified Gram-Schmidt arrangement uses a plurality of dual-input, single-output decorrelation processors (DP) arranged in ranks, with the outputs of some of the processors being broadcast (i.e. connected to the inputs of multiple other processors) to inputs of all of the DPs of the next rank. In addition, the interconnections are asymmetrically arranged. The broadcasting requirement of the modified Gram-Schmidt arrangement imposes limitations in a hardware layout, and the asymmetry makes the hardware implementation difficult. In addition to use for reducing the effects of jamming, N-channel decorrelation arrangements find other uses in radar systems, such as decorrelating the speed-representative signals at the outputs of a Doppler processor. A more symmetrical organization for multiple-channel adaptive filtering or decorrelation is desired.

SUMMARY OF THE INVENTION

A decorrelation processor includes first and second input ports and first and second output ports. The processor produces output words at its first output port which are the difference between a word previously applied to its first input port and a first product. The first product is the product of a word previously applied to its second input port and a first quotient, which is the quotient of a first summation divided by a second summation. The first summation is the summation of a predetermined number of first products, each of which represents a word currently applied to its first input port multiplied by the complex conjugate of a word currently applied to its second input port. The second summation is the summation of the predetermined number of second products, each of which second products represents the word currently applied to its second input port multiplied by its own complex conjugate. The processor produces words at its second output port which are the difference between a word previously applied to its second input port and a second product. The second product is a second quotient multiplied by a word previously applied to the first input port, and the second quotient is the quotient of the complex conjugate of the first summation divided by a third summation. The third summation is the summation of the predetermined number of third products. Each third product is of a word currently applied to its first input port multiplied by own complex conjugate.

DESCRIPTION OF THE INVENTION

Figure 1:
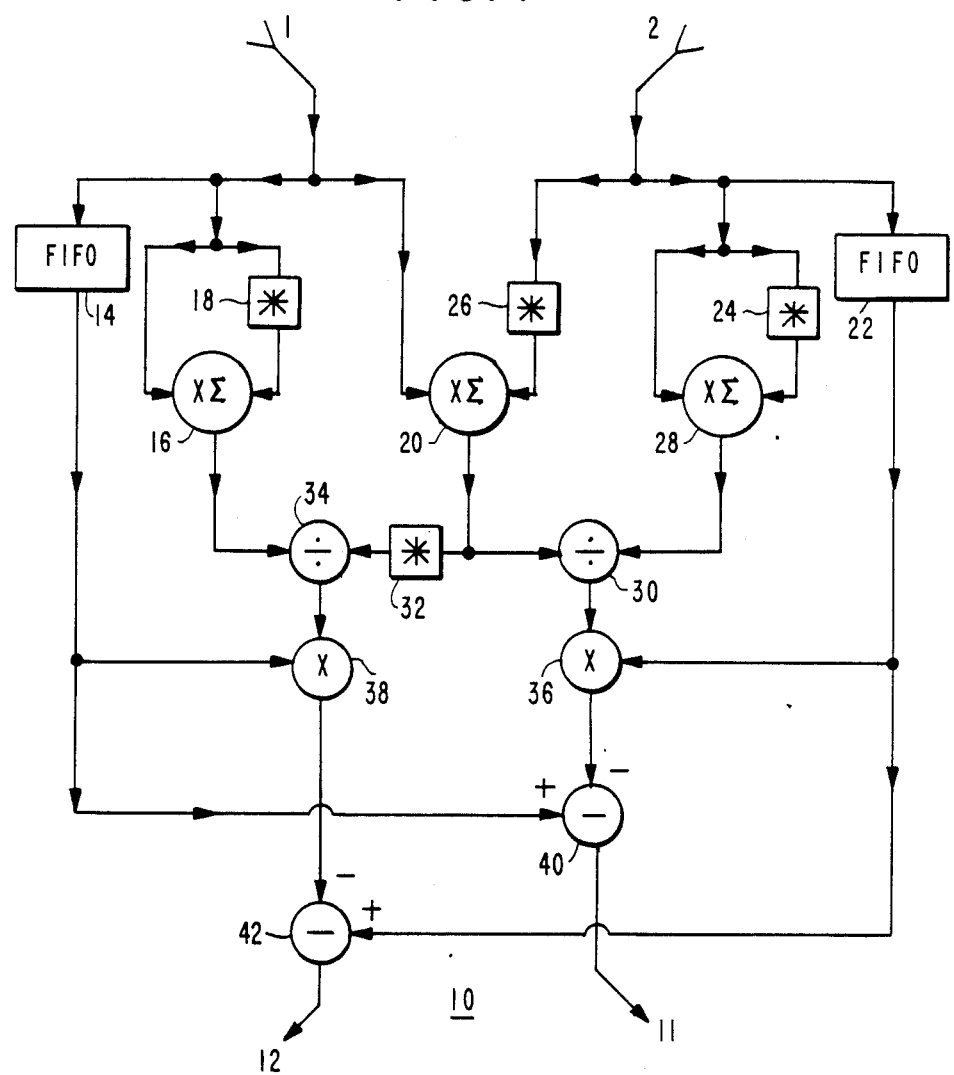
FIG. 1 is a simplified block diagram of a processing unit including first and second input ports and first and second output ports which accepts a stream of words at each of its input ports and which produces at its output ports a stream of words representing the same-channel input signal decorrelated from the signal of the other channel.

In FIG. 1, a decorrelation processor 10 includes a first input port 1 which receives a block of a predetermined number of sequential signal samples. The signal samples may, as known, be in the form of a digital signal, which is an ordered plurality of binary signals. Therefore, the conductors illustrated as single conductors are actually multiconductor buses for carrying parallel information. The input signal applied to input port 1 is applied to a first in, first out (FIFO) delay 14, to an first input of a summing multiplier 16, to a processing block 18 denoted by an asterisk (*) for taking the complex conjugate of the input signal, and to the first input of a further summing multiplier 20. The output of conjugate processing block 18 is applied to a second input of summing multiplier 16.

Input port 2 of processor 10 is adapted to receive a concurrent block of an equal number of signal samples, which are applied to a FIFO delay 22, to processing blocks 24 and 26 for taking the complex conjugate of the signal applied to port 2, and to an input of a summing multiplier 28. The output of conjugate signal processing block 24 is applied to a second input of summing multiplier 28. The output of conjugate signal processing block 26 is applied to a second input of summing multiplier 20.

In operation, the first signal samples of a block of samples are simultaneously applied to input ports 1 and 2. Summing multiplier 20 receives a first signal sample of a block from input port 1 and also receives (by way of conjugate processor 26) the conjugate of the first signal sample applied to input port 2, multiplies together the signal from port 1 and the conjugate of the signal from port 2, and stores the result. When the second signal samples arrive at input ports 1 and 2, summing multiplier 20 multiplies the second signal sample from port 1 by the conjugate of the second signal sample from port 2, and adds the result to the result of the calculation previously performed for the first signal samples. Similarly, the third signal sample from input port 1 is multiplied in summing multiplier 20 by the conjugate of the third signal sample applied to input port 2, and the result is added to the sum of the calculation performed upon the previous two samples. This process continues until the entire block of samples has been processed in this manner, to produce a number at the output of processing block 20.

Summing multiplier 16 also receives the first sample of each block of samples which is applied to input port 1, and receives at its second input the conjugate of the same first sample. Summing multiplier 16 multiplies together the first signal sample and its conjugate and retains the result. When the second signal sample arrives at input port 1, summing multiplier 16 multiplies it by its conjugate, and adds the result to the result of the previous calculation. For each of the signal samples applied to input port 1 in each block of samples, summing multiplier 16 multiplies the sample by its conjugate and adds the result to the result of the previous calculations to produce a number at the output of summing multiplier 16.

Conjugate processor 24 and summing multiplier 28 perform a function on the signal samples applied to input port 2 similar to that performed by summing multiplier 16 and conjugate processor 1B upon the samples applied to input port 1. Thus, at the end of each block of samples, a number is generated at the output of each of summing multipliers 16, 20, and 28. The output of summing multiplier 20 is divided by the output of summing multiplier 28 in a divider 30. The output signal at the output of summing multiplier 20 is processed by taking its conjugate in a processor 32, and the result is applied as a numerator to a second divider 34. Divider 34 divides the conjugate signal from processor 32 by the output of summing multiplier 16 to produce a quotient at the output of divider 34. Thus, at the end of each block of samples quotients appear at the outputs of dividers 30 and 34. The quotient at the output of divider 30 is applied to the input of a multiplier 36, and the quotient at the output of divider 34 is applied to the input of a multiplier 38. Thus, at the end of each block of signal samples applied to input ports I and 2, multipliers 36 and 38 have applied to their first inputs numbers which represent an average correlation of the signals applied to the first and second input ports.

Once dividers 30 and 34 produce quotients which are applied to multipliers 36 and 38, the set of signal samples begins to be read from FIFOs 14 and 22. The first signal samples to be read from FIFOs 14 and 22 are identical to the first signal samples of the block which were applied to input ports 1 and 2. The first signal sample read from FIFO 14 is applied to the input of multiplier 38 and to the noninverting input of a subtractor 40. Simultaneously, the first signal sample read from FIFO 22 is applied to a second input of multiplier 36 and to the noninverting input of a subtractor 42. The output of multiplier 36 is applied to the inverting input of subtractor 40, and the output of multiplier 38 is applied to the inverting input of subtractor 42. The product of the first signal sample from FIFO 14 multiplied in multiplier 38 by the quotient from divider 34 is subtracted in subtractor 42 from the first signal sample from FIFO 22 to produce at a second output port 12 a first signal sample representing the signal sample applied to input port 2 decorrelated from, or orthogonal to, the signals applied to input port 1. At the same time, the first signal sample read from FIFO 22 is multiplied in multiplier 36 by the quotient from the output of divider 30, and the product is subtracted in subtractor 40 from the first signal sample produced at the output of FIFO 14 to produce at a first output port 11 the first signal sample applied to first input port 1 decorrelated from (or orthogonal to) the signals applied to input port 2.

The next signals to be read from FIFOs 14 and 22 are the second signal samples which were applied to input ports 1 and 2. The second signal samples are processed in the same manner as the first signal samples. In particular, the second signal sample read from FIFO 14 is multiplied in multiplier 38 by the same quotient produced by divider 34 which was used to process the first signal sample, and the resulting product is subtracted in subtractor 42 from the second signal sample produced by FIFO 22 to produce at second output port 12 a signal representative of the second signal sample applied to input port 2 decor elated from the signals applied to input port 1. The second signal sample read from FIFO 22 is multiplied in multiplier 36 by the quotient from divider 30, which is the same quotient used for the processing of the first signal sample. The product is applied from multiplier 36 to the inverting input port of subtractor 40 and subtracted from the second signal sample read from FIFO 14 to produce at first output port 11 a signal representative of the second signal sample previously applied to first input port 1 decorrelated from the signals applied to input port 2.

The processing continues in this fashion, reading from FIFOs 14 and 22 the signals previously applied from input ports 1 and 2 to FIFOs 14 and 22, respectively, and for each pair of samples so read producing at output ports 11 and 12 signals representing the corresponding samples previously applied to input ports 1 and 2 decorrelated from each other. It should be noted that the signal processing occurs in two discrete stages. During the first stage, the signals are applied by way of input ports 1 and 2 and are (a) stored in FIFOs 14 and 22, respectively, and (b) processed by the summing multipliers 16, 20, and 28, and dividers 30 and 34 to produce a sum value at the outputs of dividers 30 and 34. Once the block of samples has been read in, the quotients at the outputs of dividers 30 and 34 remain constant, and the second stage of processing begins. During the second stage of processing, the signal samples are read from FIFOs 14 and 22 and processed in conjunction with the quotients at the output of dividers 30 and 34.

Figure 2:
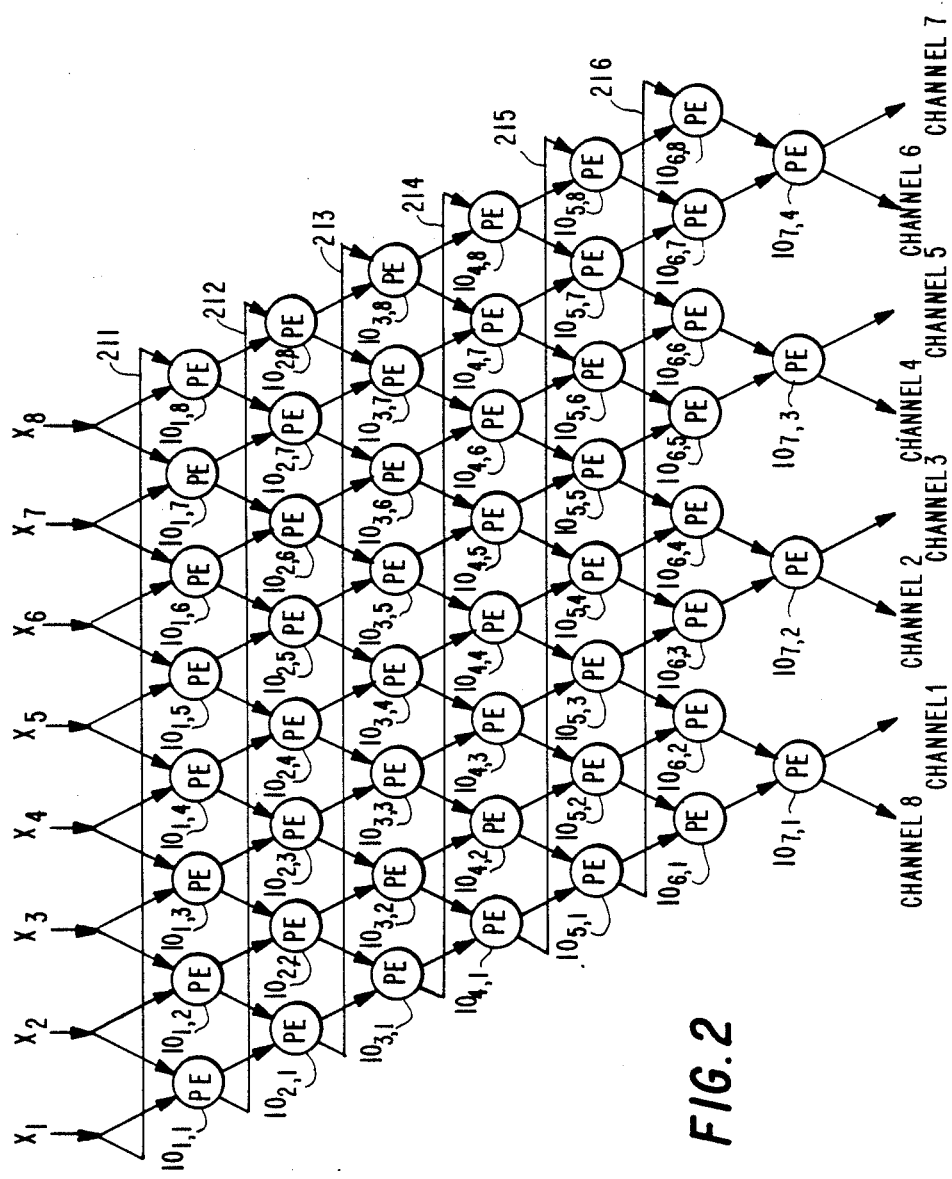
FIG. 2 illustrates the connections of a multi-channel adaptive filter or decorrelation processor for producing a like even number of output channels, wherein each output channel is completely decorrelated from all of the other channels.

FIG. 2 illustrates a regular structure in which the processing element (PE) 10 of FIG. 1 is used in ranked regular arrays for receiving inputs from an even number of channels, namely eight. The number of processing elements required for processing signals for N channels, where N is an even number, is $N^2-3N/2$, which for $N=8$ corresponds to 52 processing elements. The input signals from the eight channels may, as known, represent samples derived from eight different frequency filters in a doppler radar, in which decorrelation of the returns within each frequency band from all of the other frequency bands is desired. In FIG. 2, the incoming block of samples in channel 1 is represented by $X_1$, the block of samples in channel 2 is represented by $X_2$, and in general, the signals applied in any channel are represented as $X_N$, where N represents the channel. As in FIG. 1, the single-line paths represent multiconductor buses.

The blocks of signals arriving in channels 1 and are applied as $X_1$ and $X_2$ to first and second inputs, respectively, of a PE designated $10_{1,1}$. The subscript represents the rank or position of the particular PE in terms of row and column, respectively. Thus, PE $10_{1,1}$ is the processor at upper left of FIG. 2, in the first row and in the first (somewhat slanted) column. Similarly, PE $10_{1,2}$ is the second processor in the first row. PE $10_{1,2}$ receives an input signal $X_2$ at its first input port from channel 2 and receives $X_3$ from channel 3 at its second input port. PE $10_{1,3}$ receives signal $X_3$ at its first input port and $X_4$ at its second input port. Other PEs receive the signals from the input channels in pairs, the lower-numbered channel being applied to the first input port and the higher-numbered channel being applied to the second input port. PE $10_{1,8}$ receives signal $X_8$ from the eighth channel at its first input port and receives signal $X_1$ from the first channel at its second input port. Thus, the first channel is considered to be adjacent to the last channel.

It should be noted that, as illustrated in FIG. 2, the first input port is at upper left of each PE, and the second input port is at upper right. The first output port is at lower right, and the second output port at lower left. This has the advantage that a particular signal flows in a straight line from input to output, as described below.

Processing element $10_{1,1}$ produces at its second (lower left) output port signal $X_2$ decorrelated from signal $X_1$, and produces at its first output port (lower right) signal $X_1$ decorrelated from signal $X_2$, all in the manner described in conjunction with FIG. 1. Similarly, PE $10_{1,2}$ produces at its second output port signal $X_3$ decorrelated from signal $X_2$ and at its first output port produces signal $X_2$ decorrelated from signal $X_3$.

Processing element $10_{1,8}$ receives signal $X_8$ at its second input port and signal $X_1$ at its first input port. PE $10_{1,8}$ produces signal $X_1$ at its second output port decorrelated from signal $X_8$ and produces signal $X_8$ at its first output port decorrelated from signal $X_1$. Other PEs of the first row produce at their first output ports the signal from the lower-numbered of their input channels decorrelated from the higher-numbered of the input channels, and produce at their second output ports their higher-numbered input channel decorrelated from their lower-numbered input channel.

PE $10_{2,1}$ in the second row (in the row of second rank) of the arrangement of FIG. 2 receives at its first input port from the first output port of PE $10_{1,1}$ the $X_1$ signal decorrelated from $X_2$, and receives at its second input port from the second output port of PE $10_{1,2}$ the $X_3$ signal, also decorrelated from $X_2$. PE $10_{2,1}$ therefore produces at its second output port signal $X_3$ decorrelated from both $X_2$ and $X_1$, and produces at its first output port signal $X_1$ decorrelated from both $X_2$ and $X_3$.

PE $10_{2,8}$ (the right PE in the second row) receives at its first input port from the first output port of PE $10_{1,8}$ signal $X_8$ decorrelated from signal $X_1$, and receives at its second input port the output signal from the second output port of PE $10_{1,1}$, which is signal $X_2$ decorrelated from signal $X_1$. Consequently, PE $10_{2,8}$ produces at its second output port signal $X_2$ decorrelated from $X_1$ and $X_8$, and produces at its first output port signal $X_8$ decorrelated from $X_1$ and $X_2$. In general, the signal at an output of a PE of the array of FIG. 2 can be determined simply by projecting through the PE along diagonals. For example, the signal appearing at the second output (lower left) port of PE $10_{4,4}$ is determined by projecting upward from PE $10_{4,4}$ along the right diagonal past PE $10_{3,5}$, PE $10_{2,6}$, and PE $10_{1,7}$ to be signal $X_8$, decorrelated from (by projecting upward along the left diagonal from PE $10_{4,4}$) $X_4$, (by projecting along the left diagonal from PE $10_{3,5}$) $X_5$, (by projecting upward along the left diagonal from PE $10_{2,6}$) $X_6$, and (by projecting upward along the left diagonal from PE $10_{1,7}$) $X_7$. Thus, the signal at the second output port of PE $10_{4,4}$ is signal $X_8$ decorrelated from $X_4$, $X_5$, $X_6$, and $X_7$.

From the above discussion, it is easy to determine that the second output of PE $10_{7,1}$ (the left processor in the row of 7th rank) is signal $X_8$ decorrelated from signals $X_1$–$X_7$, and the first output of PE $10_{7,1}$ is signal $X_1$ decorrelated from signals $X_2$–$X_8$. Similarly, the signal at the second output of PE $10_{7,2}$ is (by projecting upward along the right diagonal, then to the left along line 212 to its left end, again upward along the right diagonal) $X_2$, decorrelated from $X_1$ and from $X_3$–$X_8$. The signals at the outputs of the other processing elements of the 7th row are indicated in FIG. 2. Each of the eight output signals are decorrelated from all the other seven output signals.

Figure 3:
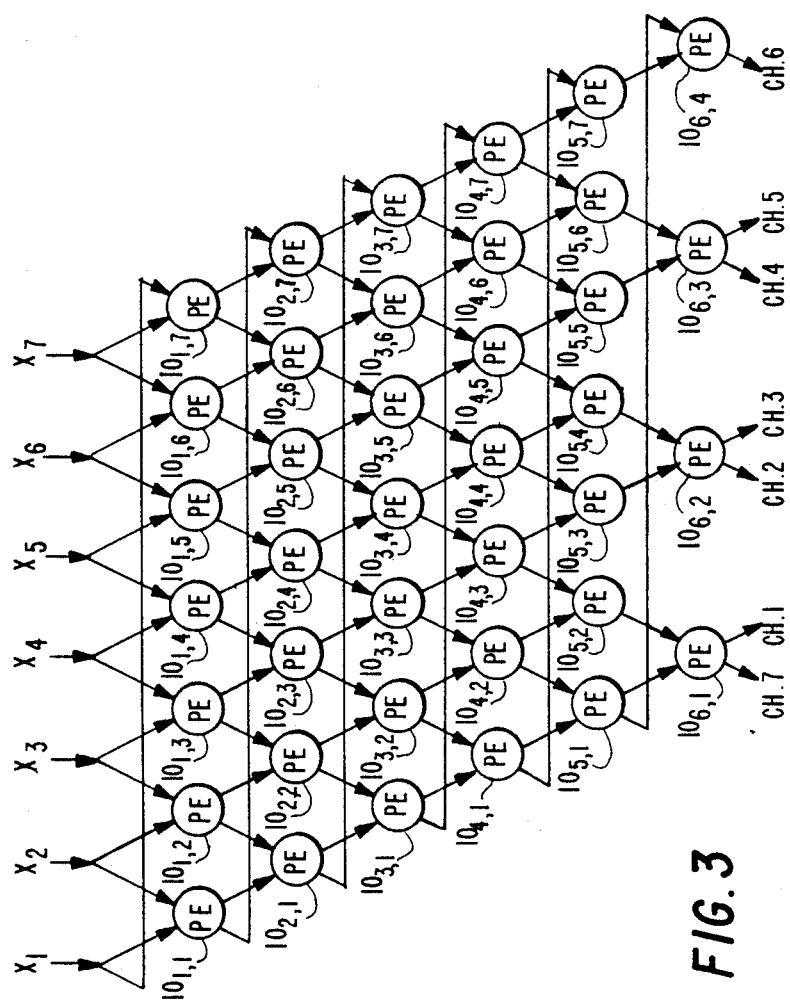
FIG. 3 illustrates the connections of a multi-channel adaptive filter or decorrelation processor for producing a like odd number of output channels, wherein each output channel is completely decorrelated from all of the other channels.

FIG. 3 illustrates an array of processors 10 for decorrelating an odd number of channels, illustrated as seven. Of course, any other odd number of channels could be used. Instead of requiring $N^2-3N/2$ processors as in the case of an even number of channels, the odd number of channels requires $N^2-(3N-1)/2$ processors. For $N=7$, the number of processors is 39. Otherwise, the arrangement of FIG. 3 is similar to that of FIG. 2.

Since the individual processors operate by first receiving a block of signals, and after the block of signals is received outputting a block of processed signals, it is possible with an appropriate switching network to feed the output signal back to the input, instead of feeding the output signal to the processors of the next rank. Thus, seven passes through one rank of seven processors can produce the same output signal as a single pass through the seven ranks of processors of FIG. 3.

Figure 4:
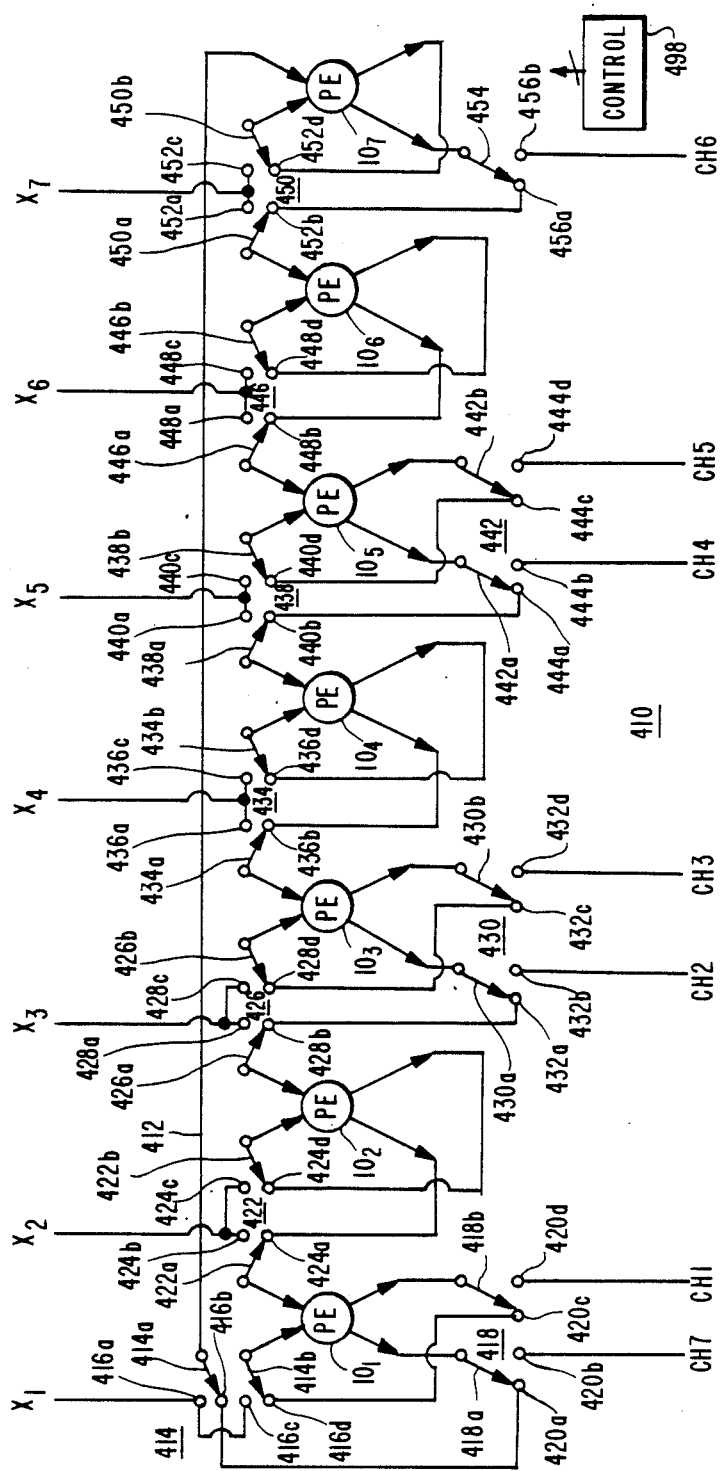
FIG. 4 illustrates the connections of a feedback decorrelation processor.

FIG. 4 illustrates an arrangement 410 with a single rank of seven PEs 10 which are interconnected by a switch network. Connection lines represent multiple conductors, and the switches are therefore multiconductor switches. In FIG. 4, input channel $X_1$ is connected to terminals 416a and 416c of a double-pole, double-throw switch 414. Switch 414 is illustrated as a mechanical switch for ease of understanding, but those skilled in the art know that solid-state switches are preferable for reliability and high-speed operation. Switch 414 includes a first toggle element 414a, the common point of which is connected by a conductor 412 to the second input of PE $10_7$, and switch 414 also includes a second toggle element 414b, which is connected to the first input of PE $10_1$. As illustrated in FIG. 4, the movable end of toggle element 414a is in contact with terminal 416b, and the movable end of toggle 414b is in contact with a terminal 416d. The illustrated position of switch 414, and the positions of the other switches of the arrangement of FIG. 4, correspond to the positions during intermediate processing, rather than during the first step of initial loading or the last step of coupling the processed signals to output channels.

The second (left) output of PE $10_1$ is connected to the common terminal of a toggle element 418a of a double-pole, double-throw switch 418. The first (right) output of PE $10_1$ is connected to a common toggle element 418b. In the positions shown, toggle element 418a is in contact with terminal 420a which is connected to terminal 416b of switch 414, and toggle element 418b is connected to a terminal 420c, which is connected to terminal 416d of switch 414. In the alternate position (the position not illustrated in FIG. 4) of switch 414, input channel $X_1$ is coupled by way of conductor 412 for feeding the second input of PE $10_7$ and by way of toggle element 414b to feed the first input of PE $10_{14}$. In the alternate position (the position not illustrated in FIG. 4) of switch 418, the second output of PE $10_1$ is connected by a terminal 420b to output channel 7, and the first output of PE $10_1$ is connected by terminal 420d to output channel 1.

Input channel $X_2$ is connected to terminals 424b and 424c of a double-pole, double-throw switch 422. Toggle element 422a of switch 422 is connected to the second input of PE $10_1$, and toggle element 422b of switch 422 is connected to the first input of PE $10_2$. In the illustrated position of switch 422, toggle element 422a is in contact terminal 424a, which is connected to the second output PE $10_2$, and toggle element 422b is in contact with terminal 424d, which is connected to the first output of PE $10_2$. Similarly, input channel $X_4$ is connected to terminals 436a and 436c of a double-pole, double-throw switch 434. Toggle element 434a of switch 434 is connected to the second input of PE $10_3$, and toggle element 434b is connected to the first input of PE $10_4$. In the positions illustrated, toggle elements 434a and 434b are in contact with terminals 436b and 436d, respectively, which are connected to the second and first output terminals, respectively, of PE $10_4$. Also in the same manner, input channel $X_6$ is connected to terminals 448a and 448c of a double-pole, double-throw switch 446. Toggle element 446a is connected to the second input of PE $10_5$ and toggle element 446b is connected to the first input of PE $10_6$. In the positions illustrated, toggle element 446a in contact with terminal 448b, which is connected to the second output of PE $10_6$, and toggle element 446b is in contact with terminal 448d which is connected to the first output of PE $10_6$.

Input channel $X_3$ is connected to terminals 428a and 428c of a double-pole, double-throw switch 426. Toggle element 426a of switch 426 is connected to the second input of PE $10_2$, and toggle element 426b is connected to the first input of PE $10_3$. The second and first outputs of PE $10_3$ are connected to toggle elements 430a and 430b, respectively, of a double-pole, double-throw switch 430. In the position illustrated, toggle element 430a is in contact with a terminal 432a, which is connected to terminal 428b of switch 426, and toggle element 430b is in contact with a terminal 432c, which is connected to terminal 428d of switch 426. Channel 2 is connected to a terminal 432b of switch 430, and channel 3 is connected to a terminal 432d. In a similar manner, input channel $X_5$ is connected to terminals 440a and 440c of a double-pole, double-throw switch 438. Toggle element 438a of switch 438 is connected to the second input of PE $10_4$ and toggle element 438b is connected to the first input of PE $10_5$. In the illustrated position of switch 438, toggle element 438a is connected to a terminal 440b, and toggle element 438b is connected to a terminal 440d. The second output terminal of PE $10_5$ is connected to the toggle element 442a of a double-pole, double-throw switch 442. The first output of PE $10_5$ is connected to a toggle element 442b of switch 442. In the illustrated position of switch 442, toggle element 442a is in contact with a terminal 444a, which is connected to terminal 440b of switch 438. Also, toggle element 442b is in contact with a terminal 444c, which is connected to terminal 440d of switch 438. Output channel 4 is connected to terminal 444b of switch 442 and output channel 5 is connected to terminal 444d.

Input channel $X_7$ is connected to terminals 452a and 452c of a double-pole, double-throw switch 450. A toggle element 450a of switch 450 is connected to the second input of PE $10_6$, and a toggle element 450b of switch 450 is connected to the first input of PE $10_7$. In the position illustrated in FIG. 4, toggle element 450a is in contact with a terminal 452b, which is connected to a terminal 456a of a single-pole, double-throw switch 454. The common element of switch 454 is connected to the second output of PE $10_7$. Output channel 6 is connected to a terminal 456b of switch 454. Toggle element 450b of switch 450 is connected to a terminal 452d, which is connected to the first output of PE $10_7$.

A controller illustrated as a block 498 is connected to the various switches and is clocked to sequence the switches in response to the incoming data as described below.

The signal arrives as a block of sequential words on each of input channels $X_1-X_7$. In order to receive the words and to load the words into the appropriate PEs, switches 414, 422, 426, 434, 438, 446 and 450 are switched or set to their upper positions (not illustrated). The position of remaining switches 418, 430, 442, and 454 is irrelevant, since they are outputs which cannot respond to signals. With the switches set for loading, signals from channel $X_1$ are applied to the first input of PE $10_1$ and to the second input of PE $10_7$. Signal $X_2$ is applied to the second input of PE $10_1$ and to the first input of PE $10_2$. Signal $X_3$ is applied to the second input of PE $10_2$ and to the first input of PE $10_3$. Signals $X_4$, $X_5$, $X_6$, and $X_7$ are applied to the first inputs of PEs $10_4$, $10_5$, $10_6$, and $10_7$, respectively, and to the second inputs of PEs $10_3$, $10_4$, $10_5$, and $10_6$, respectively. Comparison of FIGS. 3 and 4 shows that the loading procedure of the FIG. 4 arrangement is equivalent to the application of signal to the first rank or row of PEs of the FIG. 3 arrangement. As described above in conjunction with the detailed description of the PE, each PE accepts and stores the block of data, and at the completion of reception of the block of data begins to produce a block of outputs.

When the signal is processed by the PEs of FIG. 3, they are applied in particular pattern to the PEs of the second rank. During the processing in the individual PEs of FIG. 4 which follows reception of data but preceding the generation of processed data, control block 498 resets the switches to the positions illustrated in FIG. 4. This results in reapplication of the signals produced at the outputs of the PEs to the inputs of the PEs, in the same pattern as the flow from the first to the second rank in FIG. 3. With the switches in the positions illustrated in FIG. 4, the second output of PE $10_1$ is applied to the second input of PE $10_7$. Reference to FIG. 3 indicates that the second output of PE $10_{1,1}$ is applied to the second input of PE $10_{2,7}$. Thus, the arrangement of FIG. 4 gives a corresponding input to PE $10_7$ for the second pass through the array of processors. In FIG. 4, the first output of PE $10_1$ is applied back to the first input of PE $10_1$. The corresponding flow in FIG. 3 is of the first output of PE $10_{1,1}$ to the first input of PE $10_{2,1}$.

The second output of PE $10_2$ of FIG. 4 is applied to the second input of PE $10_1$. The corresponding flow in FIG. 3 is between the second output of PE $10_{1,2}$ and the second input of PE $10_{2,1}$. In FIG. 4, the first output of PE $10_2$ is applied back to the first input of PE $10_2$. The corresponding flow in FIG. 3 is between the first output of PE $10_{1,2}$ and the first input of PE $10_{2,2}$. In FIG. 4, the second output of PE $10_3$ is connected to the second input of PE $10_2$. Correspondingly, PE $10_{1,3}$ of FIG. 3 has its second output connected to the second input of PE $10_{2,2}$. The first output of PE $10_3$ of FIG. 4 is connected back to the first input of PE $10_3$. This corresponds in FIG. 3 to the connection between the first output of PE $10_{1,3}$ and the first input of PE $10_{2,3}$. The second and first outputs of PE $10_4$ of FIG. 4 are connected to the second input of PE $10_3$ and back the first input of PE $10_4$, respectively. This corresponds in FIG. 3 to the connection between the second output of PE $10_{1,4}$ and the second input of PE $10_{2,3}$, and to the connection between the first output of PE $10_{1,4}$ and the first input of PE $10_{2,4}$. In FIG. 4, PE $10_7$ has its second and first outputs connected to the second input of PE $10_6$ and to the first input of PE $10_7$, respectively. This corresponds in FIG. 3 to the connection between the second output of PE $10_{1,7}$ and the second input of PE $10_{2,6}$, and between the first output of PE $10_{1,7}$ and the first input of PE $10_{2,7}$, respectively. The correspondence of the remainder of the connections between the first and second ranks of FIG. 3 will be apparent in view of the preceding discussions.

Thus, with the connections illustrated in FIG. 4, the signals processed after the first pass through the rank of PEs flow back to the inputs in a pattern which corresponds to the flow of signal in FIG. 3 from the outputs of the first rank of PEs to the inputs of the second rank. Consequently, the PEs of FIG. 4 receive at their inputs signals which correspond to the signals which would be received by the second rank of PEs of FIG. 3. These signals are received and processed as discussed above, producing after the second pass through the rank of PEs of FIG. 4 at each PE output a block of sequential words. Thus, the signal at the second output of PE $10_1$ of FIG. 4 after the second pass corresponds to the signal at the second output of PE $10_{2,1}$ of FIG. 3. In FIG. 4, this signal is coupled, with the switches still in the positions illustrated, to the second input of PE $10_7$, thereby making the connection which is made in FIG. 3 between the second output of PE $10_{2,1}$ and the second input of PE $10_{3,7}$. Similarly, the first output of PE $10_1$ of FIG. 4 is connected to its own input. This corresponds to the connection between the first output of PE $10_{2,1}$ and the first input of PE $10_{3,1}$ of FIG. 3. One can readily understand that multiple passes of the signal through the single rank of PEs of FIG. 4 corresponds to flow in succession through the ranks of the PEs of FIG. 3. Thus, after four passes, the signals at the outputs of the PEs of FIG. 4 correspond to the signals applied from the fourth to the fifth rank of PEs of FIG. 3. The switches of FIG. 4 remain in the same condition after the fourth pass, and the signals are recirculated once more. Once the signals are loaded into the PEs of FIG. 4 to begin the fifth pass, this corresponds to the flow of signal from the fourth rank of PEs of FIG. 3 to the fifth rank. Controller 498 leaves the switches in the positions shown, and after the fifth pass, the signals once again recirculate back to the inputs of the PEs to begin a sixth pass. This corresponds to the application of signals from the outputs of the fifth rank of PEs of FIG. 3 to the sixth rank. The loading for the sixth pass has the effect of transferring signal from the fifth rank of PEs of FIG. 3 to a sixth rank of PEs, which includes seven elements. However, the actual sixth rank of FIG. 3 includes only four PEs. This difference in the number of PEs is taken into account in FIG. 4. At the sixth pass, after the signals are loaded into the PEs, controller 498 throws output switches 418, 430, 442, and 456 to their alternate positions (not illustrated).

In the alternate position of the output switches of FIG. 4, the outputs of PEs $10_1$, $10_3$, 10, and the first output of PE $10_7$ are coupled to output channels 1-7. The outputs of PEs $10_2$, $10_4$ and $10_6$ are not utilized as system outputs, which corresponds to the reduced number of PEs in the last row of FIG. 3.

Other embodiments of the invention will be apparent to those skilled in the art. For example, the PEs may be adapted for processing of a continuous flow of information rather than batch processing by simply weighting older data so that older data has progressively less importance, thereby creating a moving "window" of newer data, older data of lesser importance, and yet older data which is of vanishingly small importance. In effect, such a moving window at any particular moment processes a predetermined number of significant words as established by the weighting.

What is claimed is;

1. A decorrelation processor for processing blocks of concurrent signals in first and second channels, said processor comprising:
 first and second processor input ports coupled to said first and second channels, respectively, for receiving said blocks of signals from said first and second channels, respectively;
 first subtracting means including an output port coupled to said first processor output port, and also including first and second input ports, for subtracting words applied to said first input port from words applied to said second input port;
 second subtracting means including an output port coupled to said second processor output port, and also including first and second input ports, for subtracting words applied to said first input port from words applied to said second input port;

first multiplying means including first and second input ports, and also including an output port coupled to said first input port of said first subtracting means for multiplying together words applied to said first and second input ports of said first multiplying means to produce a first product, and for applying said first product to said first input port of said first subtracting means;

first FIFO delay means coupled to said second processor input port, to said first input port of said first multiplying means, and to said second input port of said second subtracting means, for delaying said signals applied to said second processor input port until an entire one of said blocks of signals has been received at said second processor input port, and for thereafter coupling said signals on a first in, first out basis to said first input port of said first multiplying means and to said second input port of said second subtracting means;

second multiplying means including first and second input ports, and also including an output port coupled to said first input port of said second subtracting means, for multiplying words applied to said first and second input ports of said second multiplying means to produce a second product, and for applying said second product to said first input port of said second subtracting means;

second FIFO delay means coupled to said first processor input port, to said first input port of said second multiplying means, and to said second input port of said first subtracting means, for delaying said signals applied to said first processor input port until an entire one of said blocks of signals has been received at said first processor input port, and for thereafter coupling said signals on a first in, first out basis to said first input port of said second multiplying means and to said second input port of said first subtracting means;

first complex conjugate processing means coupled to said second processor input port, for generating the complex conjugate of each of said signals of each of said block of signals received at said second processor input port;

first summing multiplier means including first and second input ports and an output port, said first input port of said first summing multiplier means being coupled to said second processor input port, and said second input port of said summing multiplier means being coupled to said first complex conjugate processing means, for sequentially receiving said signals of said blocks of signals applied to said second processor input port, for multiplying each of said signals by its complex conjugate to produce third products, which third products are summed over the entirety of each of said blocks of signal to produce first summed products at said output port of said first summing multiplier means;

second summing multiplier means including first and second input ports and an output port, said first input port of said second summing multiplier means being coupled to said first processor input port for sequentially receiving said signals of said blocks of signals applied to said first processor input port, for multiplying each of said signals by a signal applied to said second input port of said second summing multiplier means to produce fourth products, which fourth products are summed over the entirety of one of said blocks of signal to produce second summed product at said output port of said second summing multiplier means;

second complex conjugate means coupled to said second input port of said second summing multiplier means, for coupling to said second input port of said second summing multiplier means signals corresponding to said complex conjugate of each of said signals of each of said blocks of signals received at said second processor input port, whereby said second summing multiplier means sums the product of each of said signals applied to said first processor input port multiplier by the complex conjugate of the corresponding one of said signals applied to said second processor input port;

first dividing means including a first input port coupled to said output port of said first summing multiplier means, a second input port coupled to said output port of said second summing multiplier means, and an output port coupled to said second input port of said first multiplying means, for dividing said second summed product by said first summed product to produce a first quotient, and for applying said first quotient to said second input port of said first multiplying means;

third complex conjugate processing means coupled to said first processor input port, for generating the complex conjugate of each of said signals of each of said blocks of signals received at said first processor input port;

third summing multiplier means including a first input port coupled to said first processor input port and a second input port coupled to said third complex conjugate processing means, and also including an output port, for sequentially receiving said signals of said blocks of signals applied to said first processor input port and for multiplying each of said signals by its complex conjugate to produce fifth products, which fifth products are summed over the entirety of each of said blocks of signal to produce third summed products at said output port of said third summing multiplier means;

fourth complex conjugate processing means coupled to said output port of said second summing multiplier means for producing the complex conjugate of said second summed products; and second dividing means including a first input port coupled to said output port of said third summing multiplier means, a second input port coupled to said fourth complex conjugate processing means, and an output port coupled to said second input port of said second multiplying means, for dividing said complex conjugate of said second summed products by said third summed products to produce a second quotient, and for applying said second quotient to said second input port of said second multiplying means.

2. A processor according to claim 1 wherein said second complex conjugate means comprises second complex conjugate processing means separate from said first complex conjugate processing means.

* * * * *